United States Patent [19]

Last et al.

[11] 4,055,695

[45] Oct. 25, 1977

[54] FOAMED POLYOLEFINE FILMS

[75] Inventors: Anthony Graham Marshall Last, Welwyn Garden City; John Albert Rixon, Shefford, both of England

[73] Assignee: Imperial Chemical Industries Limited, London, England

[21] Appl. No.: 568,835

[22] Filed: Apr. 17, 1975

Related U.S. Application Data

[63] Continuation of Ser. No. 105,622, Jan. 11, 1971, abandoned.

[30] Foreign Application Priority Data

Jan. 30, 1970 United Kingdom ............... 4647/70

[51] Int. Cl.$^2$ ..................... B32B 3/10; B32B 5/18
[52] U.S. Cl. ................... 428/195; 260/2.5 E; 260/2.5 HA; 260/897 A; 428/309; 428/311; 428/523
[58] Field of Search ..... 260/2.5 E, 2.5 HA, 94.9 GC, 260/897 A; 428/310, 309, 311, 315, 195

[56] References Cited

U.S. PATENT DOCUMENTS

| | | | |
|---|---|---|---|
| 3,310,422 | 3/1967 | Petry | 428/315 X |
| 3,418,066 | 12/1968 | Caldwell et al. | 260/94.9 |
| 3,496,124 | 2/1970 | Needham et al. | 260/2.5 |
| 3,501,370 | 3/1970 | Juredine | 428/315 |
| 3,574,659 | 4/1971 | Kwart et al. | 428/311 X |
| 3,586,645 | 6/1971 | Granger et al. | 260/2.5 |
| 3,637,458 | 1/1972 | Parrish | 428/415 |
| 3,645,929 | 2/1972 | Normanton | 260/2.5 |
| 3,677,980 | 7/1972 | Last | 260/2.5 HA |
| 3,679,538 | 7/1972 | Druin et al. | 428/311 X |
| 3,839,238 | 10/1974 | Ealding | 260/2.5 E |
| 3,846,349 | 11/1974 | Harada et al. | 260/2.5 HA |
| 3,856,719 | 12/1974 | Miyamato et al. | 260/2.5 HA |
| 3,871,897 | 3/1975 | Ealding | 260/2.5 E X |
| Re. 24,062 | 9/1955 | Horton | 260/94.9 |

FOREIGN PATENT DOCUMENTS

| | | |
|---|---|---|
| 730,947 | 10/1969 | Belgium |
| 1,220,053 | 1/1971 | United Kingdom |
| 1,081,606 | 8/1967 | United Kingdom |
| 1,143,109 | 2/1969 | United Kingdom ............ 428/315 |

OTHER PUBLICATIONS

Journal of Cellular Plastics, Feb. 1967, pp. 70, 71.

*Primary Examiner*—P.E. Willis, Jr.
*Attorney, Agent, or Firm*—Cushman, Darby & Cushman

[57] ABSTRACT

Foamed films of blends of low density polythene and a crystalline polyolefine which have been subjected to surface treatment.

8 Claims, No Drawings

FOAMED POLYOLEFINE FILMS

This is a continuation of application Ser. No. 105,622 filed Jan. 11, 1971, now abandoned.

The present invention relates to foamed polyolefine films; in particular to such films which may be used as wall and ceiling covering materials.

It has already been proposed that foamed low density or foamed high density polyethene may be used as wall covering materials. There are, however, four important criteria a material must satisfy if it is to be suitable for wall covering materials. Firstly, the abrasion and scuff resistance of the material must be good so that it will withstand the hard wearing conditions to which wall coverings are subjected and secondly the material must have good ink retention so that patterns and designs may be printed thereon and these patterns and designs must also be resistant to abrasion both when dry and when wet so that the wall coverings may be washed. Furthermore, it is important that the wall coverings adhere satisfactorily to the wall or backing paper but it is preferred that the adhesion is such that the covering may be peeled away from the wall while dry.

We have found that the abrasion resistance of foamed low density polythene is not adequate to provide long lasting wall papers which are subjected to hard wear. Furthermore, we have found that although the abrasion resistance of foamed high density polythene or other crystalline polyolefines is superior to that of foamed low density polythene the ink abrasion resistance is poor.

An object of the present invention is therefore to provide a foamed polyolefine material which has good scuff and abrasion resistance consistent with satisfactory ink retention for printing purposes and satisfactory ink abrasion resistance together with adequate adhesion to walls. In particular the present invention provides foamed materials which are suitable for use as wall covering materials.

According to the present invention we provide a film of a foamed polyolefine derived from a blend containing between 60% and 90% by weight of low density polythene and between 40% and 10% by weight of a crystalline polyolefine the surface of said film having been subjected to surface treatment at least on the surface to be printed to improve the bonding properties of its surface.

By low density polythene we mean polymers and copolymers of ethylene having a density of less than 0.934. The copolymers should contain no more than 20% by weight of monomers copolymerisable with ethylene. The crystalline polyolefine may be high density polythene, by which is meant polythene of normal density, between 0.94 and 0.97, all these density measurements being made at 23° C according to British Standard 3412 of 1966. Polypropylene or a copolymer of ethylene and propylene may be used although high density polythene is our preferred material.

The preferred foamed polyolefine films of the present invention have an opened cell structure consisting, according to the method of Remington and Pariser set out in Rubber World of May 1958 pages 261 to 264, of between 40% and 90% open cells. The films are preferably between 0.01 and 0.03 inch thick, of bulk density between 0.1 and 0.4 grams/cc and as they are generally produced by extrusion the cells tend to be oriented along the axis of the cell parallel to the machine direction. The majority of the cells are between 100 and 500 microns long and between 20 and 150 microns wide.

The foamed polyolefine films of the present invention are particularly useful as wall and ceiling covering materials. However, it is highly desirable that if the material are used as wall coverings they should be opaque and should have a substantially matt white appearance which is not unduly tinged with greyness. We, therefore, prefer that the foamed films of the present invention include 5 to 20% by weight of titanium dioxide and from 0.05 to 1.0% of metallic aluminium particles of median size at least 20 μ as opacifying agent as is described in our copending British application No. 25864/69. The necessity for whiteness depends, however, on the colour to be imparted to the paper; if some greyness can be tolerated a small amount of carbon black, for example up to 100 parts per million may be included to improve opacity.

The surface treatment to which the film should be subjected to improve the bonding properties of its surface may be a physical or a chemical treatment or the film may be coated with a layer of a more polar material. For example, the surface of the film may be subjected to chemical oxidation by treatment with a mixture of chromic acid and sulphuric acid, may be physically treated by subjecting the surface of the foamed film to corona discharge treatment or may be coated with a layer of a polar polymer such as chlorinated polythene which may conveniently be applied as a solution and the solvent evaporated off. The film may be treated on both its surfaces so that the ink abrasion resistance and the adhesion to the wall or backing paper is improved. However, it is within the present invention that the film is only treated on the side which is to be printed. In fact, our preferred method of treating is to subject the foamed film to corona discharge treatment only on the surface which is to be printed, we have found that this type of treatment has a certain effect on the reverse side of the film and improves the adhesion between the paper and the wall but only to an extent that the film may generally be peeled away from the wall while still dry when normal wall paper adhesives are used. Our preferred method of treating the film is illustrated in FIG. 5 of page 139 of "Plastics and Polymers" of Apr. 1969.

Other particularly suitable methods are those disclosed in British Pat. Nos. 1,042,049 and 1,100,414. The speed at which the film travels through the discharge treatment apparatus and the potential applied to the electrodes should be adjusted to obtain the required ink abrasion resistance, particularly resistance when wet, and adhesion properties and will depend upon the proportion of high density polythene in the film. If the ink abrasion resistance properties of the films are improved by coating the film with a more polar polymer the improvement in adhesion increased with the thickness of the coating and we prefer that coating should be effected with as little abrasion of the film as possible as any abrasion tends to worsen the ink abrasion resistance.

The present invention also provides a process for the production of a foamed film comprising extruding a blend containing between 60% and 90% by weight of low density polythene and between 40% and 10% by weight of a crystalline polyolefine, said blend containing a blowing agent the temperature of extrusion being above the gas evolution temperature of the blowing agent and subsequently subjecting the surface of the foamed film to a treatment to improve the bonding properties of the surface.

The blends containing a blowing agent which are used in the process of the present invention may be extruded from an annular or a slot die although our preferred method is to extrude through an annular die and to inflate the tube so produced.

The blowing agent which foams the blend on extrusion may be any suitable material which produces a gas on extrusion to cause the blend to foam. The blowing agent may be a liquid which produces the gas by vaporization. The term gas evolution temperature as used herein is used to describe the temperature at which a liquid blowing agent vaporizes.

We particularly prefer to use a two component blowing agent system such as the ones described in our co-pending British application No. 3362/67. The first blowing agent in these systems is completely miscible with the molten blend and the second blowing agent has a solubility of at least 0.01% by weight in the blend and has a critical temperature below the temperature of the homogeneous mixture of the molten blend and the blowing agent system at the point when the pressure on the mixture is released during extrusion.

The blend of the polyolefines and the blowing agent system may be mixed in a pressure vessel which is preferably an extruder through which the molten thermoplastic is passed and which may be fitted with any suitable die to produce the end product of the required shaped. Since it is found that the best foaming is produced when the distance over which the pressure drop from the interior of the vessel to the atmosphere is as short as possible we prefer to use a die having a short land. We have found that the texture of the foamed film is improved if the pressure in the molten polymer blend at the extrusion die is sufficiently high to maintain both the blowing agents in solution in the molten polymer. We also prefer to use an excess of the first blowing agent as compared with the amount required to cause foaming so that the latent heat of vaporization of the excess blowing agent cools the sheet on extrusion to set the extruded blend in its foamed state.

The first and the second blowing agents are selected so that they are inert with respect to the blended polyolefines under the pressure and temperature conditions of the extruder. The first blowing agent which is completely miscible with the blended polyolefines to be foamed may be a solid, a liquid or a gas at normal temperature and pressure. It must, however, have a boiling point below the temperature at which the homogeneous mixture is extruded at the pressure prevailing in the region into which the mixture is extruded (which will normally be atmospheric) so that the foaming will occur at that temperature. We have found that the most suitable substances for use as the first blowing agent are liquids whose boiling points at atmospheric pressure are greater than room temperature, i.e. 20° C and are at least 10° C below the temperature at which the homogeneous mixture is extruded.

Examples of liquids which may be used as the first blowing agent in our invention include saturated hydrocarbons such as pentane, hexane, heptane, octane, methyl pentane and dimethyl pentane, unsaturated hydrocarbons such as pentene, 4-methylpentene, hexene, petroleum ether fractions, and halogenated hydrocarbons such as carbon tetrachloride, chloroform, ethylene dichloride, methylene chloride, or 1,1,3-trichloro-1,2,2-trifluoroethane. Our preferred first blowing agents are pentane, 1,1,3-trichloro-1,2,2-trifluoroethane, hexane, petroleum ether (B.P. 40° to 60° C or 60° to 80° C) or methylene chloride.

In order to produce foamed articles of density 0.1 to 0.4 g/cc from polyolefines, a concentration of the first blowing agent whose function is partly one of chilling the foam by evaporation of at least 10% is normally required. If a concentration of first blowing agent of more tha 50% is used, then the product is expensive to produce and there is a tendency for the cell walls in the foamed product to disintegrate so that an unsatisfactory product is obtained.

Because of the requirement that its critical temperature should be less than the temperature of the homogeneous mixture on extrusion, the second blowing agent is normally a gas, although certain low boiling liquids may be used. It is essential that the second blowing agent should have at least some solubility (0.01%) in the polyolefine blend and/or the first blowing agent under the conditions of pressure and temperature within the extruder since otherwise there will not be sufficient of the second blowing agent in the homogeneous mixture to nucleate a large number of very small bubbles on extrusion and prevent nculeation arising solely from the first blowing agent with the result that a small number of very large bubbles are produced and the product is of little commercial use. We have found that carbon dioxide, nitrogen, air (for polymers or first blowing agents not subject to oxidation), methane, ethane, propane, ethylene, propylene, hydrogen, helium, argon and halogenated derivatives of methane and ethane, e.g. tetrafluorochloroethane are substances which may be used. We prefer to use carbon dioxide or nitrogen in a concentration of at least 0.05%. It is possible, although less preferred to nucleate with other materials such as finely divided solids or metallic soaps.

The foams thus produced must next be subjected to a surface treatment to improve the bonding properties of its surface, the foam may be subjected to physical or chemical surface treatment or may be coated with a layer of a more polar polymer. However, we prefer that the foamed film is subjected to corona discharge treatment only on the surface which is subsequently to be printed.

We have found that by preparing the foamed films of the present invention from blends containing between 60% and 90% of low density polythene and between 40% and 10% of a crystalline polyolefine, preferably high density polythene and then subjecting the surface of the film to surface treatments of the type described foamed films with improved surface abrasion resistance together with good ink abrasion resistance may be obtained. The ink abrasion resistance of the film when wet after discharge treatment tends to decrease as the amount of high density polythene in the blend increases, and for this reason we prefer to manufacture our foamed films from blends containing from 20% to 35% by weight of high density polythene and from 80% to 65% by weight of low density polythene. These films have the best conmbination of properties when subject to surface modification in particular discharge treatment on the surface that is to be printed.

The present invention is illustrated but in no way limited by reference to the accompanying examples parts of which are comparative. In these examples foamed films were produced by extruding a polythene composition containing 10 parts of a masterbatch of 60% by weight titanium dioxide of average particle size 0.5 μ and 40% by weight low density polythene. The composition was blended in a screw blender for 10 minutes and then fed to the feed hopper of a 1¼ inch extruder containing a normal polythene type screw and modified by a further section as described in our co-pending British Patent Application No. 3362/67. The first part of the extension was a decompression zone into which nitrogen and pentane were metered at 1800 p.s.i. The subsequent section of the screw extension provides mixing and metering. The mixture was extruded through a breaker pate on the downstream side of which the temperature was 128° C and the pressure 200 p.s.i. into an annular die which had a 6 inch lip diameter and a 0.020 inch die lip gap. The tube was extruded vertically upwards and blown by an air pressure of between 1 and 2 inches of water within the tube into a tube of 16 inches circumference, thickness about 0.015 inch and density 0.17. The tube was collapsed, slit to flat form and wound into a reel.

Various films were prepared in which the polythene composition contained different amounts of low density polythene (density 0.922) and high density polythene (density 0.96). Some of the samples were subjected to discharge treatment and some were not. Those which were subjected to treatment, were treated on one side only, using a Lepel model HFSG/6 Corona discharge treater, by passing the film over a mica-covered metal roll at a speed of 50 ft/min, beneath an electrode system 49 inches long and placed 0.060 inch from the surface of the roll, and to which a high frequency potential of approximately 15,000 volts was supplied. Adequate treatment was achieved only at power settings greater than 4 on the machine scale.

The abrasion resistance of the film was determined by sticking the film to a flat base and traversing the film with a reciprocating steel tool. The tool weighed 400 grams, was ½ inch wide and was reciprocated at 40 cycles per minute over a track 3 inches long. The abrasion resistance was determined by the number of passes of the tool before pilling or break up of the surface occurred. The ink abrasion resistance of printed samples of the film was measured in the same way, the resistance being determined by the number of passes of the tool required to remove the ink.

The abrasion resistance of printing on the film when wet was determined by flooding the surface of the film with a 1% detergent solution and passing a piece of sponge 1 inch by ½ inch by ¼ inch over the film. The sponge was passed over the film so as to describe a circle of 2½ inch diameter at a speed of 60 revolutions per minute under a load of 160 grams. The wet abrasion resistance of the printing on the film was determined by the number of passes of the sponge necessary to remove the ink.

EXAMPLE 1

This Example was carried out to determine the effect of increasing the high density polythene content of the polythene composition on the dry abrasion resistance of film that had not been surface treated. The results obtained were as set out in Table 1.

TABLE 1

| Polythene Composition | | Dry Abrasion Resistance |
|---|---|---|
| Parts of low density Polythene | Parts of high density Polythene | No. of passes of Tool before Pilling |
| 100 | — | 2 |
| 90 | 10 | 60 |
| 85 | 15 | 190 |
| 80 | 20 | 200 |
| 75 | 25 | 1000 |
| 70 | 30 | 1500 |
| 65 | 35 | 3000 |
| 60 | 40 | 3000 |

EXAMPLE 2

This example was carried out to determine the effect of discharge treatment as described above on the wet and dry ink abrasion resistance of films which had been printed by flexographic printing and which contained varying proportions of low and high density polythene. The results obtained are set out in Table 2.

TABLE 2

| Polythene Composition | | No Discharge Treatment | | Discharge Treated at a speed of 50 ft/minute | |
|---|---|---|---|---|---|
| Parts of Low Density Polythene | Parts of High Density Polythene | No. of Passes to remove ink when dry | No. of Passes to remove ink when wet | No. of Passes to remove ink when dry | No. of Passes to remove ink when wet |
| 100 | 0 | 20 | — | 120 | 400 |
| 90 | 10 | 7 | 1500 | 800 | 220 |
| 85 | 15 | | — | 850 | 250 |
| 80 | 20 | 3 | 1000 | 1200 | 200 |
| 75 | 25 | | — | 2000 | 190 |
| 70 | 30 | 1 | — | 1800 | 160 |
| 65 | 35 | | — | 2800 | 170 |
| 60 | 40 | 1 | 600 | 4800 | 140 |

As can be seen from Table 2 the presence of the high density polythene together with discharge treatment substantially improves the ink abrasion resistance of the film when dry although the abrasion resistance when wet is decreased.

However, we have found that the decrease in abrasion resistance when wet may be minimised by controlling the degree of discharge treatment, for example by controlling the speed at which the film is travelling while it is being subjected to discharge treatment as is illustrated in Table 3.

TABLE 3

| High Density Polythene content in blend | Film Speed ft/minute | No. of Passes of Tool to remove ink when dry | No. of Passes of Tool to remove ink when wet |
|---|---|---|---|
| 15% | 50 | 850 | 250 |
| 15% | 100 | 900 | 220 |
| 15% | 150 | 1700 | 380 |

EXAMPLE 3

Film was prepared by the process described above from a polythene composition containing 40 parts of high density polythene and 60 parts of low density polythene. Instead of subjecting the film to discharge treatment it was coated with a saturated solution of chlorinated polythene in methylene chloride using various coating methods.

| Method of Coating | Ink Retention when Dry | |
|---|---|---|
| | Polyamide Ink | Acrylic Ink |
| Uncoated base film | 5 | 15 |
| Brush coated with only methylene chloride | 30 | 90 |
| Brush coated with solution of chlorinated polythene | 400 | 1000 |
| Coated with chlorinated polythene solution using wire wound bar | 20 | 250 |
| Dip coated with chlorinated polythene solution | 800 | 4000 |

EXAMPLE 4

A blend containing 90 parts by weight of low density polythene and 10 parts by weight of polypropylene was processed to produce foamed film by the process set out above using an extrusion temperature of 142° C. The bulk density of the foamed film obtained was 0.383 grams/cc. The dry abrasion resistance of the foamed film obtained was measured by the test previously decribed and the film withstood 43 passes of the tool before pilling occurred.

We claim:

1. A wall or ceil covering comprising a printed open celled foamed film of foamed polyolefine derived from a blend containing between 60% and 90% by weight of low density polythene and between 40% and 10% by weight of a crystalline polyolefine, said foamed film having a bulk density between 0.1 and 0.4 grams/cc and an open cell structure in the range of 40 to 90% open cells, the surface of said film having been subjected to surface treatment on at least one surface to improve the ink bonding properties of that surface, said film being characterized by higher abrasion resistance and higher dry ink abrasion resistance than corresponding surface treated film made from 100% by weight low density polythene.

2. A covering according to claim 1 containing from 20% to 35% by weight of high density polythene and from 80% to 65% by weight of low density polythene.

3. A covering according to claim 1 having a thickness of between 0.01 and 0.03 inches.

4. A covering according to claim 1 in which the majority of the cells are between 100 and 500 microns long and between 20 and 150 microns wide.

5. A covering according to claim 1 containing 5 to 20% by weight of titanium dioxide.

6. A covering according to claim 1 containing from 0.05 to 1.0% of metallic aluminium particles of median particle size at least 20 $\mu$.

7. A covering according to claim 1 containing up to 100 parts per million of carbon black.

8. A covering according to claim 1 in which the surface treatment comprises chemical oxidation.

* * * * *